United States Patent [19]

Buxbaum et al.

[11] 4,264,462
[45] Apr. 28, 1981

[54] STABILIZATION OF MAGNETITE PIGMENTS WITH HETEROCYCLIC NITROGEN COMPOUNDS

[75] Inventors: Gunter Buxbaum, Krefeld; Bernd Stephan, Bederkesa; Franz Hund; Gerhard Schroeder, both of Krefeld, all of Fed. Rep. of Germany

[73] Assignee: Bayer Aktiengesellschaft, Leverkusen, Fed. Rep. of Germany

[21] Appl. No.: 944,501

[22] Filed: Sep. 21, 1978

[30] Foreign Application Priority Data

Oct. 4, 1977 [DE] Fed. Rep. of Germany ....... 2744598
Jul. 7, 1978 [DE] Fed. Rep. of Germany ....... 2829962

[51] Int. Cl.³ .......................... H01F 1/36; B05D 5/00
[52] U.S. Cl. ................................. 252/62.53; 427/220; 427/255.6
[58] Field of Search ................... 427/213, 220, 248 H, 427/255.6; 252/62.53

[56] References Cited

U.S. PATENT DOCUMENTS

| | | | |
|---|---|---|---|
| 2,914,424 | 11/1959 | Murray | 427/248 H |
| 3,795,539 | 3/1974 | Dimino | 252/62.54 X |
| 3,852,069 | 12/1974 | Van Paeschen et al. | 252/62.53 X |
| 4,073,977 | 2/1978 | Koester et al. | 427/216 |

FOREIGN PATENT DOCUMENTS

| | | | |
|---|---|---|---|
| 1159731 | 12/1963 | Fed. Rep. of Germany | 427/248 H |
| 1282023 | 12/1961 | France | 427/248 H |

*Primary Examiner*—F. Edmundson
*Attorney, Agent, or Firm*—Sprung, Felfe, Horn, Lynch & Kramer

[57] ABSTRACT

A finely divided magnetite pigment such as is used in magnetic tapes is stabilized against oxidation by contact with a heterocyclic nitrogen compound such as morpholine, triazole, piperazine or substitution products thereof. The heterocyclic compound can be applied as a solution or in vapor form.

20 Claims, 1 Drawing Figure

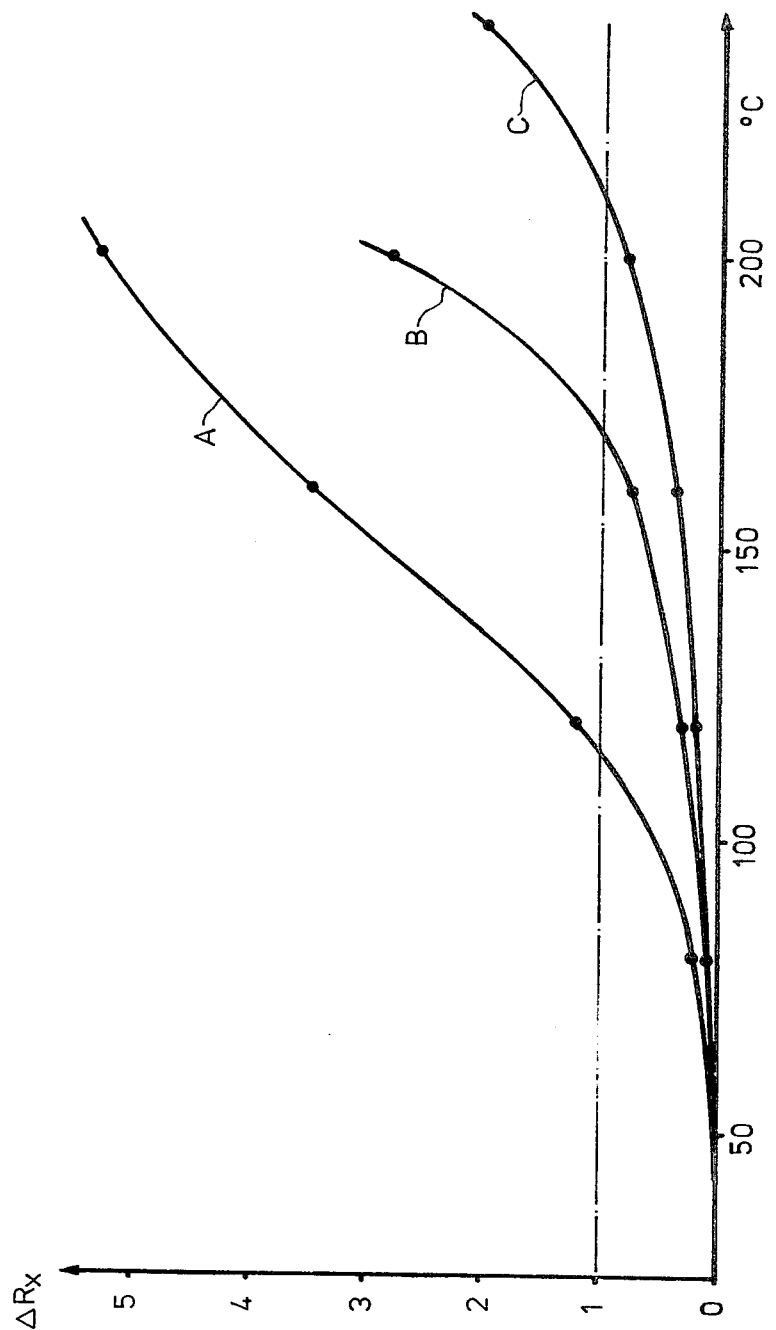

STABILIZATION OF MAGNETITE PIGMENTS WITH HETEROCYCLIC NITROGEN COMPOUNDS

The present invention relates to the stabilization of magnetite pigments with heterocyclic nitrogen compounds.

Ferrimagnetic magnetite pigments in the context of the present invention are $Fe_3O_4$ and mixed phases of $Fe_3O_4$ with $\gamma$-$Fe_2O_3$ and/or ferrites of the $MeFe_2O_4$-type having the general composition $Fe_x^{2+}Fe_y^{3+}+Me_z^{2+}+O_4$, the following relations being intended to apply:

$$0.1 \leq x \leq 1;$$

$$0 \leq z \leq 0.5;$$

$$x + z \leq 1;$$

$$2x + 3y + 2z \approx 8;$$

$$8/3 \leq (x+y+z) \leq 3.$$

Me represents one or more cations from the group comprising Zn, Mn, Co, Ni, Ca, Mg, Ba, Cu, Cd. x should preferably have a value of from 0.5 to 1.

The use of ferrimagnetic magnetite pigments as magnetic recording supports has been repeatedly proposed. Although these ferrimagnetic magnetite pigments have also been occasionally used for magnetically recording signals, they have never been used commercially on a large scale because all the hitherto known magnetite pigments which are suitable for use in, for example, magnetic tapes have the serious disadvantage of being unstable in air and oxygen. This instability can become so serious that entire production batches burn up. The acicular ferrimagnetic magnetite pigments having specific surfaces of $\geq 12$ $m^2/g$ as measured by the BET-method, which are used for the production of magnetic tapes are particularly sensitive.

The sensitivity of magnetite oxide pigments to oxidation by air is greater, the more finely divided the pigments, or the larger their specific surface. On the other hand, the noise properties of magnetic tapes produced from them are more favorable, the more finely divided the pigments used. Finely divided magnetic magnetite pigments, of the type described, for example, in DOS No. 2,510,799, oxidise in air at temperatures as low as from 40° to 100° C. Temperatures of this order, however, are often encountered after production during storage and transport under the usual conditions in railway cars or trucks during summer weather conditions, so that magnetite pigments of the type in question are impossible to use in practice.

Accordingly, one object of the present invention is to provide finely divided, acicular ferrimagnetic magnetite pigments which are stable to oxidation by air under heat and which may therefore be stored, transported and worked into lacquers without any danger.

It has now surprisingly been found that, by treating the magnetic pigments with organic compounds containing nitrogen-functional groups, it is possible to obtain new magnetite pigments with a high stability to oxidation by air.

In the context of the present invention, "stability to oxidation by air" is understood to be the temperature defined by the following measuring method:

A test tube of 3 cm inner diameter and of a length of 10 cm is filled with pigment powder up to a height of 3 cm. The test tube is then exposed to air for 1 hour at a constant preselected temperature. Immediately after cooling, the magnetite pigment is thoroughly mixed in an agate mortar and the resulting mixture is pressed for 20 seconds under a pressure of about 20 bars to form a powder tablet approximately 4 mm in diameter. The pressing thus obtained is then measured at one end with a filter spectral photometer (ELREPHO) in remission with the $R_x$-filter (the red color component). The difference between the $R_x$-values of a tempered specimend and an untempered specimen ($\Delta R_x$) is a measure of the proportion of $\gamma$-$Fe_2O_3$ which is formed during the tempering treatment. The temperature at which a test specimen, of which the $\Delta R_x$-value = 1.0 by comparison with the untempered specimen, was tempered is defined as a measure of the stability to oxidation by air.

The accompanying diagram shows, for 3 examples described in detail hereinbelow, the dependence of the $\Delta R_x$-value upon the temperature at which the particular tempering treatment was carried out. Curve A represents the trend of the $\Delta R_x$-value for the untreated specimen of Example 3a, curve B represents the trend in the case of sample 3b and Curve C the trend of the $\Delta R_x$-value of the specimen of Example 6e.

The present invention relates to finely divided acicular ferrimagnetic magnetite pigments having a stability to oxidation by air of at least about 150° C. Finely divided acicular ferrimagnetic magnetite pigments having a stability in air above about 170° C. are preferred, those having an oxidative stability above about 190° C. being particularly preferred.

The specific surface of the pigments according to the present invention amounts to more than 12 $m^2/g$ and preferably to from about 18 to 30 $m^2g$, as measured by the BET-method. The average length-to-width ratio of the acicular pigments is from about 2 to 20 and preferably from about 6 to 10.

The present invention also relates to a process for producing the magnetite pigments according to the present invention.

The process is characterised in that finely divided acicular ferrimagnetic magnetite pigments produced by a known method are treated in a non-oxidising atmosphere with at least one optionally substituted heterocyclic organic compound, at least one of the hetero atoms being a nitrogen atom.

The organic heterocyclic compound may contain from 1 to 4 nitrogen atoms as hetero atoms. Preferred organic heterocyclic compounds are those containing from 1 to 3 nitrogen atoms as hetero atoms. In addition oxygen or sulphur atoms may be present as further hetero atoms. The hetero-ring may be saturated, unsaturated or aromatic.

Suitable substituents are hydroxy, alkyl, hydroxyalkyl, aminoalkyl, amine, monoalkylamine, dialkylamine, alkoxy, alkyloxy, alkylalkoxy and/or thio groups, of which alkyl, alkoxy, alkyloxy and alkylalkoxy groups containing from 1 to 4 carbon atoms are particularly suitable.

Cyclic aminoethers, such as morpholine, and cyclic amines, such as piperidine or piperazine, and derivatives thereof have proved to be particularly effective. Of these, N-(2-hydroxyethyl)-piperazine is preferred. Nitrogen-containing heterocyclic compounds, such as pyridine or 1,2,4-triazole, have also proved to be effective. Their derivatives, for example, 3-amino-1,2,4- triazole, α-aminopyridine or N-(3-aminopropyl)morpholine, are also preferably used.

The novel process for stabilisation against oxidation by air is distinguished by its extreme simplicity. In general, there is no need for the magnetite pigment to be made into a paste, nor for the aftertreatment substance to be precipitated, nor for any other wet measures to be taken. An inert gas stream may be passed through one of the above-mentioned compounds, charged with vapors of the compound and subsequently passed over the product. The rate of flow of the gas stream should be adjusted in such a way that about 0.05 to 10% by weight of the described organic compound, based on the iron oxide pigment, are blown in over the treatment time which is preferably from about 1 minute to a few hours. In general, a certain stabilizing effect can even be obtained with quantities of less than about 1%. However, quantities of about 2 to 5% by weight, based on the pigment to be stabilized, are much more effective.

One particularly favorable apparatus for carrying out the treatment is a fluidised bed, although a rotary tube or fixed-bed reactor may also be used without any disadvantages.

In the case of readily volatile organic compounds, it is even sufficient to store magnetite and morpholine for example together for a prolonged period in a sealed container, stabilisation occurring during storage. In one particularly simple procedure, the necessary quantities of readily volatile organic compounds are added during the introduction of the iron oxide pigments into the packaging containers.

If the organic compound has an excessively low vapor pressure, the pigment may be suspended in the liquid organic compound or in an organic compound dissolved in a suitable solvent and freed from the excess liquid by filtration or pressing followed by drying.

In the case of substantially non-volatile compounds, the organic compounds according to the present invention and the iron oxide pigments may be heated together to temperatures of up to about 200° C. in a mixing or grinding unit, and subsequently cooled.

The treatment temperature should preferably be from about 20° to 150° C. Higher temperatures are, however, harmless in the absence of air, although the decomposition temperature of the particular compound used should not be exceeded.

It is not certain how the stabilizing substances act. It may be assumed that the active surface centers which are responsible for oxidative instability to air are deactivated by the adsorption of the compounds mentioned. Reactions may even take place between the molecules and the surface centers. The process involved may be assumed to be similar to that which characterises the inactivation of catalysts by catalyst poisons.

The present invention also relates to the use of the finely divided, acicular ferrimagnetic magnetite pigments treated in accordance with the invention for the production of magnetic recording supports.

The magnetite pigments to be treated may be produced in accordance with any of the usual processes by dehydrating and reducing α-, β- and γ-FeOOH, as described for example, in U.S. Pat. Nos. 3,947,502 and 3,931,025. The known measures against sintering and also aftertreatments and doping treatments do not interfere with the application of the process according to the present invention. The magnetic pigments may also be obtained by reduction from γ-$Fe_2O_3$ or even directly in the form of anisometric magnetite from iron salt solutions by known methods of precipitation and oxidation.

The present invention is illustrated by the following examples and the drawing:

EXAMPLE 1a

A standard commercial-grade magnetic γ-$Fe_2O_3$ having a crystallite size of approximately 600 Å, as determined by X-ray photography, a specific surface of 12 $m^2/g$ according to BET, a $B_r/\rho$-value of 445 Gcc/g and an $_iH_C$-value of 355 Oe, of the type used for studio recording purposes and available under the name MAG 1730 of Bayer AG, is reduced with moist hydrogen in 30 minutes at 400° to 420° C. and cooled under nitrogen to room temperature.

The remanence ($B_r/\rho$) value now amounts to 477 Gcc/g and the $_iH_C$-value to 364 Oe. The stability test gives a value of 123° C.

EXAMPLE 1b

In a fluidized bed 50 mm in diameter, 80 g of the product of test 1 a were treated for 13 minutes at room temperature with a stream of nitrogen (approximately 200 liters per hour) charged with morpholine at room temperature. 1.4% by weight of morpholine were introduced, based on the magnetite. The stability test gives a value of 161° C.

EXAMPLE 2a

A standard commercial-grade magnetic γ-$Fe_2O_3$ having a crystallite size of approximately 550 Å, as determined by X-ray photography, a specific surface of 15 $m^2/g$ according to BET, a $B_r/\rho$-value of 450 Gcc/g and an $_iH_C$-value 330 Oe, of the type available under the name MAG 1740 of Bayer AG, is reduced with moist hydrogen in 30 minutes at from 400° to 420° C. and cooled to room temperature in an inert gas atmosphere. The magnetite has a remanence value ($B_r/\rho$) of 508 Gcc/g and a coercive field strength ($_iH_C$ of 353 Oe. The stability limit is 120° C.

EXAMPLE 2b 167 g of the product of Example 2a were charged with morpholine for 20 minutes in the same way as described in Example 1b. 1.3% by weight of morpholine were blown in, based on magnetite. The stability limit is 174° C.

EXAMPLE 3a

A standard commercial-grade magnetic-γ-$Fe_2O_3$ having a crystallite size as determined by X-ray photography of 550 Å, a specific surface of 18 $m^2/g$ according to BET, a $B_r/\rho$-value of 460 Gcc/g and an $_iH_C$-value of 375 Oe, of the type used in low-noise tapes and available under the name MAG 1748 of Bayer AG, is reduced with moist hydrogen for 30 minutes at 400° C. and cooled to 30° C. in an inert gas atmosphere. The following values are then measured: $B_r/\rho$=502 Gcc/g, $_iH_C$=371 Oe and stability limit=115° C.

EXAMPLE 3b 165 g of the product of Example 3a are treated with morpholine for 23 minutes in the same way as described in Example 1b. 1.3% by weight of morpholine were introduced, based on $Fe_3O_4$. The stability limit rose to 171° C.

EXAMPLE 4a

A standard commercial grade cobalt-doped $\gamma$-$Fe_2O_3$ having a crystallite size as determined by X-ray photography of approximately 440 Å, a specific surface of 20 $m^2/g$ according to BET, a $B_r/\rho$-value of 490 Gcc/g and an $_iH_C$-value of 630 Oe, of the type used in video tapes and available under the name of AC 5062 of Bayer AG, is reduced with moist hydrogen for 30 minutes at 400° C. The magnetite formed has the following composition:

$$Co_{0.1}{}^{2+}Zn_{0.01}{}^{2+}Fe_{0.83}{}^{2+}Fe_{2.02}{}^{3+}O_4.$$

The stability limit is 121° C.

EXAMPLE 4b 120 g of the product of Example 4a are treated for 10 minutes in the same way as described in Example 1b. 1.0% by weight of morpholine was introduced. The stability limit rose to 155° C.

EXAMPLE 5a $\alpha$-FeOOH is produced in accordance with U.S. Pat. No. 3,931,025 by precipitating 20 liters of $FeSO_4$-solution containing 135 g of $FeSO_4$ per liter and 28.3 g of $ZnSO_4$. 7 $H_2O$ with a solution of 11.5 g of $Na_3PO_4.12 H_2O$ in 1.8 liters of 43% by weight sodium hydroxide solution at a temperature of 65° C., followed by oxidation by air for 3.5 hours until the pH-value has fallen to below 4. Thereafter formation of the $\alpha$-FeOOH is completed over a period of 16 hours at 80° C. by uniformly adding 1.9% sodium hydroxide solution and introducing air. Towards the end of pigment formation, a solution of 30 g of $Na_4P_2O_7.10 H_2O$ in 400 ml of $H_2O$ is added dropwise. After washing to remove sulphate, the $\alpha$FeOOH is dried at 120° C. and tempered in air for 30 minutes at 660° C. After reduction with moist hydrogen for 30 minutes at 400° C., the following values are obtained: $B_r/\rho=430$ Gcc/g, $_iH_C=323$ Oe, specific surface=27 $m^2/g$ and stability limit=106° C.

EXAMPLES 5b AND c

The magnetite of Example 5a is treated with morpholine in the same way as in Example 1b. The tests are summarised in Table 1:

TABLE 1

| Example No. | Substance | Quantity | Stability limit [°C.] |
|---|---|---|---|
| 5a | none | — | 106 |
| 5b | morpholine | 2.1% by weight | 151 |
| 5c | morpholine | 5.0% by weight | 178 |

EXAMPLE 6a

An $\alpha$-FeOOH seed suspension is prepared in the same way as described in Example 5a, but with 100 g of $FeSO_4$ per liter and 28.8 g of $ZnSO_4$ with the addition of 14.1 g of $NaH_2PO_4.2 H_2O$ in 2 liters of 23% NaOH. 3.6 liters of $FeSO_4$-solution containing 216 g/l of $FeSO_4$ and 22.3 g of $ZnSO_4.7 H_2O$ are then added, after which the procedure is the same as described in Example 5a except that, towards the end of pigment formation, 25 g of $Na_4P_2O_7$ in 800 ml of water are added dropwise.

After drying, the product is tempered for 30 minutes at 780° C., reduced with moist hydrogen for 60 minutes at 420° to 450° C. and cooled under nitrogen to room temperature. The following values were measured: $B_r/\rho=460$ Gcc/g, $_iH_C=430$ Oe and stability limit=120° C.

EXAMPLE 6b

The product according to Example 6a is treated with morpholine in the same way as described in Example 1b.

EXAMPLES 6c TO f

Examples 6c, d and e were prepared as follows:
400 g of the magnetite and the quantity indicated in Table 2 of the substances according to the present invention are mixed in a flask, heated under nitrogen for 1 hour to around from 150° to 200° C. and then cooled again.

The result of the stabilisation step is shown in Table 2. Comparison test 6f carried out with cyclohexane demonstrates the ineffectiveness of a pure hydrocarbon compound.

TABLE 2

| Example No. | Substance | Quantity [% by weight] | Stability limit [°C.] |
|---|---|---|---|
| 6a | none | — | 120 |
| 6b | morpholine | 2.5 | 178 |
| 6c | N-(2-hydroxyethyl)-piperazine | 3.0 | 194 |
| 6d | 1,2,4-triazole | 3.0 | 182 |
| 6e | 3-amino-1,2,4-triazole | 3.0 | 212 |
| 6f | cyclohexane | 9.0 | 120 |

Of the substances tested, morpholine, N-(3-aminopropyl)-morpholine, N-(2-hydroxyethyl)-piperazine, 1,2,4-triazole and 3-amino-1,2,4-triazole proved to be particularly effective. Good stabilising effects may also be expected from other N-containing heterocyclic compounds and their derivatives and, of these, from amino-substituted derivatives.

FIG. 1 shows the dependence of stability upon quantity, upon the magnetite itself and upon the stabilizing agent.

It will be appreciated that the instant specification and examples are set forth by way of illustration and not limitation, and that various modifications and changes may be made without departing from the spirit and scope of the present invention.

What we claim is:

1. A finely divided acicular ferrimagnetite pigment stable against oxidation by air of at least 150° C.

2. A magnetite pigment according to claim 1, stable against oxidation by air of 170° C.

3. A magnetite pigment according to claim 1, having a specific surface according to BET of more than 12 $m^2/g$.

4. A magnetite pigment according to claim 1, having a length to width ratio of from about 2 to 20.

5. A magnetite pigment produced according to claim 1, stable against oxidation by air of 190° C., having a length to width ratio of from about 6 to 10 and a specific surface according to BET of from about 18 to 30 $m^2/g$.

6. A process for producing a finely divided acicular magnetite pigment stable against oxidation by air of at least 150° C., comprising contacting a finely divided acicular ferrimagnetic iron oxide in a non-oxidizing atmosphere with at least one optionally substituted heterocyclic organic compound until the pigment on its surface picks up the heterocyclic compound, at least one of the hetero atoms being a nitrogen atom, and recovering the stabilized finely divided magnetite pigment.

7. A process according to claim 6, wherein the heterocyclic organic compound contains oxygen or sulphur as a further hetero atom.

8. A process according to claim 6, wherein the heterocyclic organic compound contains from 1 to 3 nitrogen atoms.

9. A process according to claim 8, wherein the heterocyclic organic compound is substituted with at least one hydroxy, alkyl, amine, monoalkylamine, dialkylamine, alkoxy, alkyloxy, alkylalkoxy or thio radical.

10. A process according to claim 9, wherein the heterocyclic organic compound is amine-substituted.

11. A process according to claim 6, wherein the heterocyclic organic compound is morpholine.

12. A process according to claim 6, wherein the heterocyclic organic compound is 1,2,4-triazole.

13. A process according to claim 6, wherein the heterocyclic organic compound is N-(2-hydroxyethyl)-piperazine.

14. A process according to claim 6, wherein the heterocyclic organic compound is 3, amino-1,2,4-triazole.

15. A process according to claim 6, wherein the magnetite pigment is contacted with a vapor of the heterocyclic organic compound at a temperature of about 20° C. to 150° C.

16. A process according to claim 15, wherein the contact is carried out with the pigment in a fluidized bed with nitrogen containing the vapor as a carrier gas.

17. A process according to claim 6, wherein the heterocyclic organic compound is applied as a solution to the magnetite pigment.

18. A process according to claim 8, wherein the heterocyclic organic compound is employed in about 0.05 to 10% by weight based on the magnetite pigment.

19. A magnetite pigment produced by the process of claim 6, stable against oxidation by air of 190° C. having a length to width ratio of from about 6 to 10 and a specific surface according to BET of from about 18 to 30 $m^2/g$.

20. A process according to claim 6, wherein the treatment is effected in a non-oxidizing atmosphere.

* * * * *

UNITED STATES PATENT AND TRADEMARK OFFICE
CERTIFICATE OF CORRECTION

PATENT NO. : 4,264,462
DATED : April 28, 1981
INVENTOR(S) : Gunter Buxbaum et al It is certified that error appears in the above-identified patent and that said Letters Patent are hereby corrected as shown below:

Column 6, line 49, after "150°C" insert

--produced according to claim 6--.

Signed and Sealed this

Twenty-sixth Day of January 1982

[SEAL]

Attest:

GERALD J. MOSSINGHOFF

Attesting Officer — Commissioner of Patents and Trademarks